United States Patent [19]
Beveridge et al.

[11] 3,762,762
[45] Oct. 2, 1973

[54] COVER AND LIFTING MECHANISM FOR PICK-UPS

[76] Inventors: Thomas E. Beveridge, P.O. Box 393, Hurst, Tex. 76053; Stephen G. Andrle, 3132 S. Kingbury, Fort Worth, Tex. 76118

[22] Filed: May 28, 1971

[21] Appl. No.: 148,067

[52] U.S. Cl............................................ 296/137 B
[51] Int. Cl............................................... B60j 7/10
[58] Field of Search................ 296/137 B, 100, 76; 248/73, 201, 223, 224, 225

[56] References Cited
UNITED STATES PATENTS
| | | | |
|---|---|---|---|
| 3,051,523 | 8/1962 | Boyce | 296/100 |
| 1,504,478 | 8/1924 | Hyser | 248/201 |
| 1,975,701 | 10/1934 | Poos | 296/76 |

Primary Examiner—Benjamin Hersh
Assistant Examiner—Robert R. Song
Attorney—Howard W. Moore and Gerald G. Crutsinger

[57] ABSTRACT

Apparatus to detachably secure a cover over the load bed of a pickup truck comprising brackets having slots formed therein secured to upper and lower portions of the load bed, and stanchions having pins which slide into the slots to secure the stanchions to the brackets. The cover is pivoted to the upper ends of the stanchions such that the cover may be connected or removed from the vehicle by sliding the pins on the stanchions into or out of the slots in the brackets. An over-center type linkage biases the cover to open and close positions.

13 Claims, 10 Drawing Figures

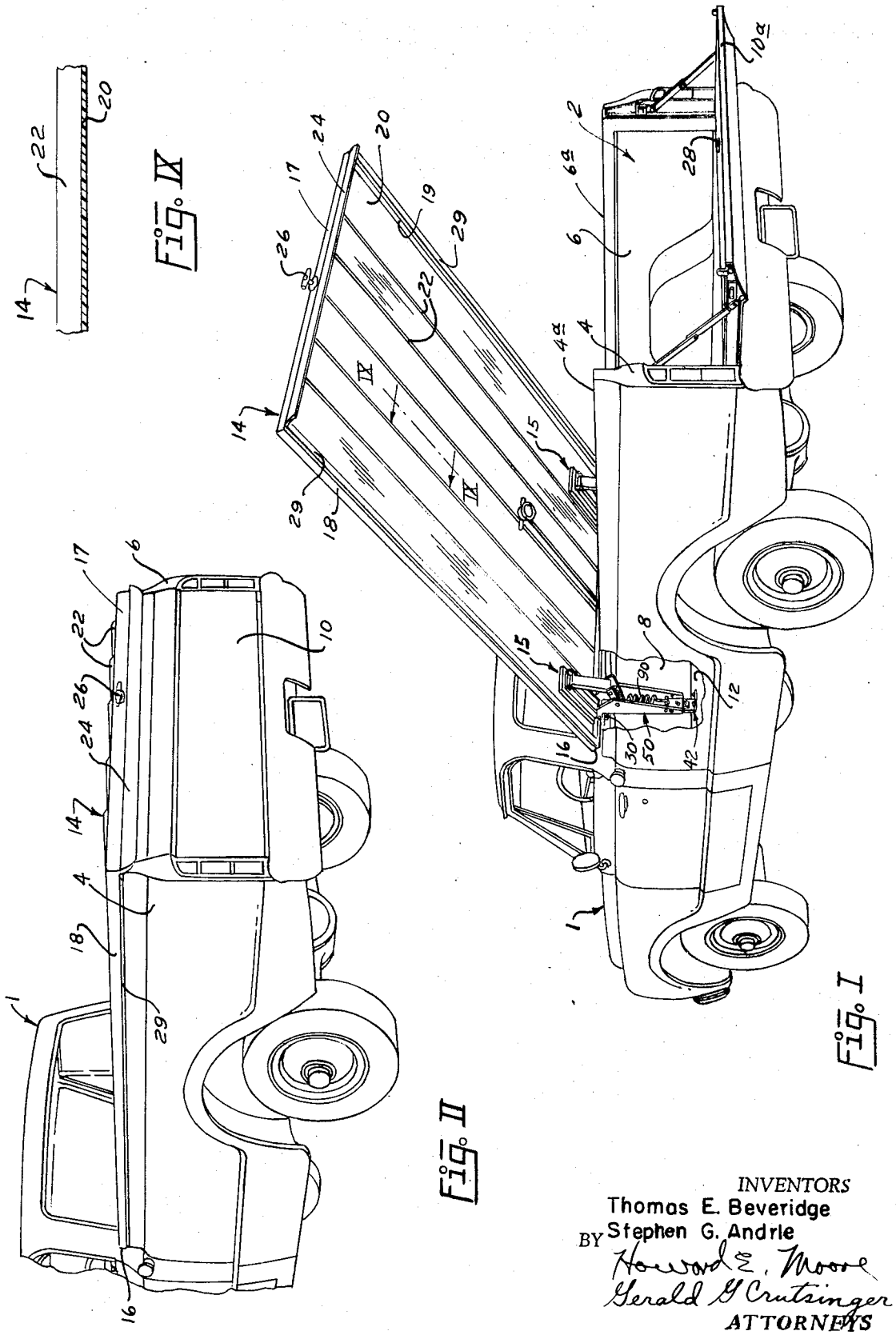

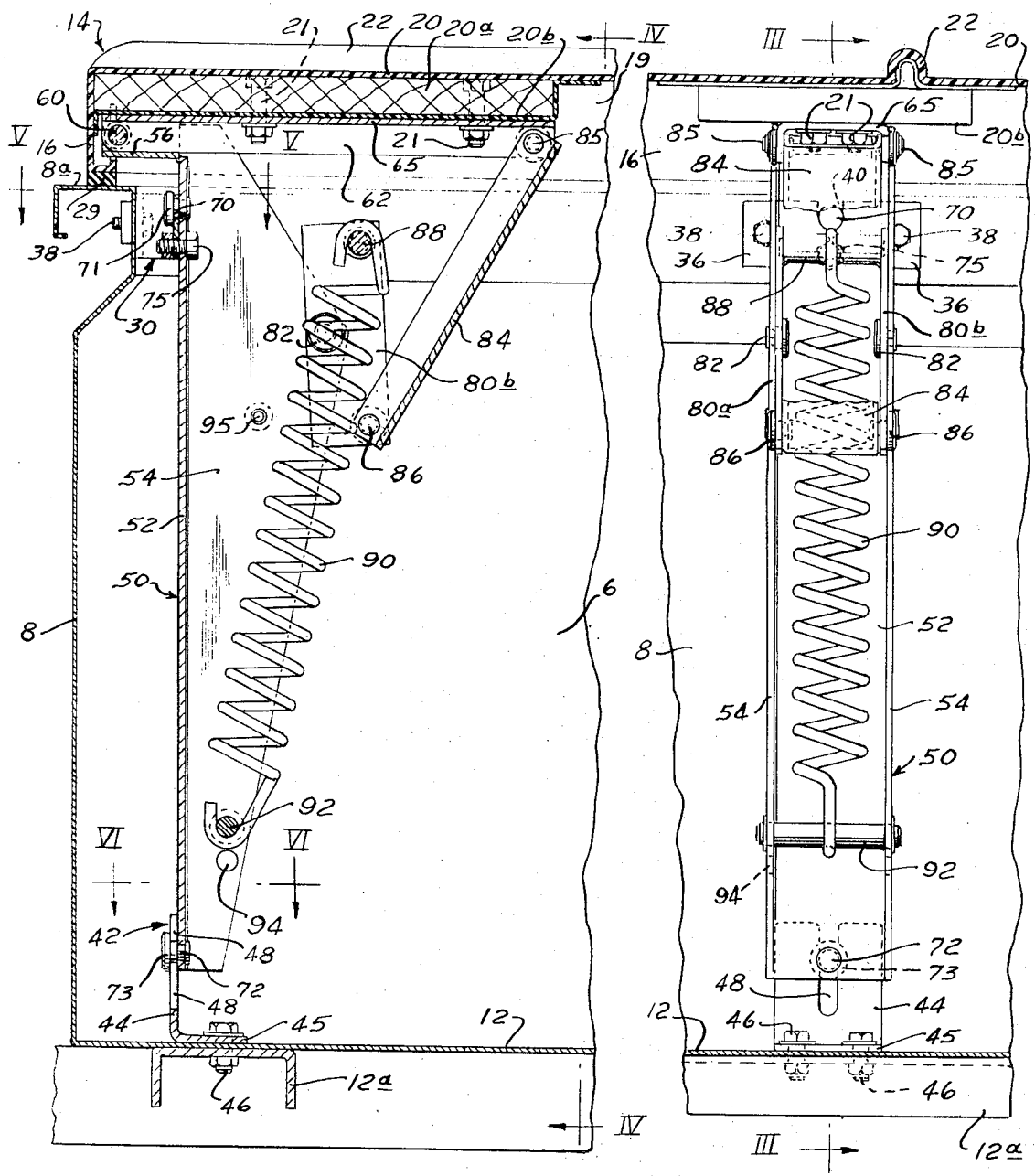
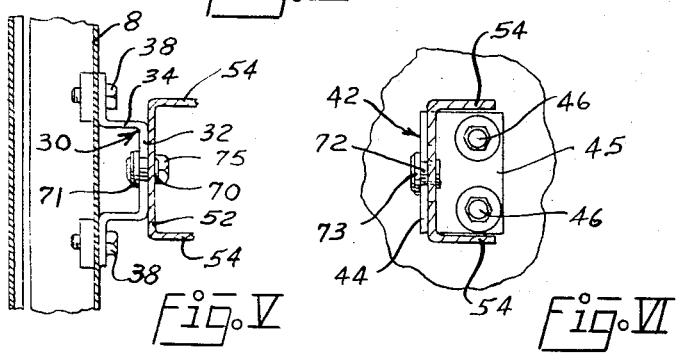
Fig. III Fig. IV
Fig. V Fig. VI
INVENTORS
Thomas E. Beveridge
Stephen G. Andrle PATENTED OCT 2 1973 3,762,762
SHEET 3 OF 3
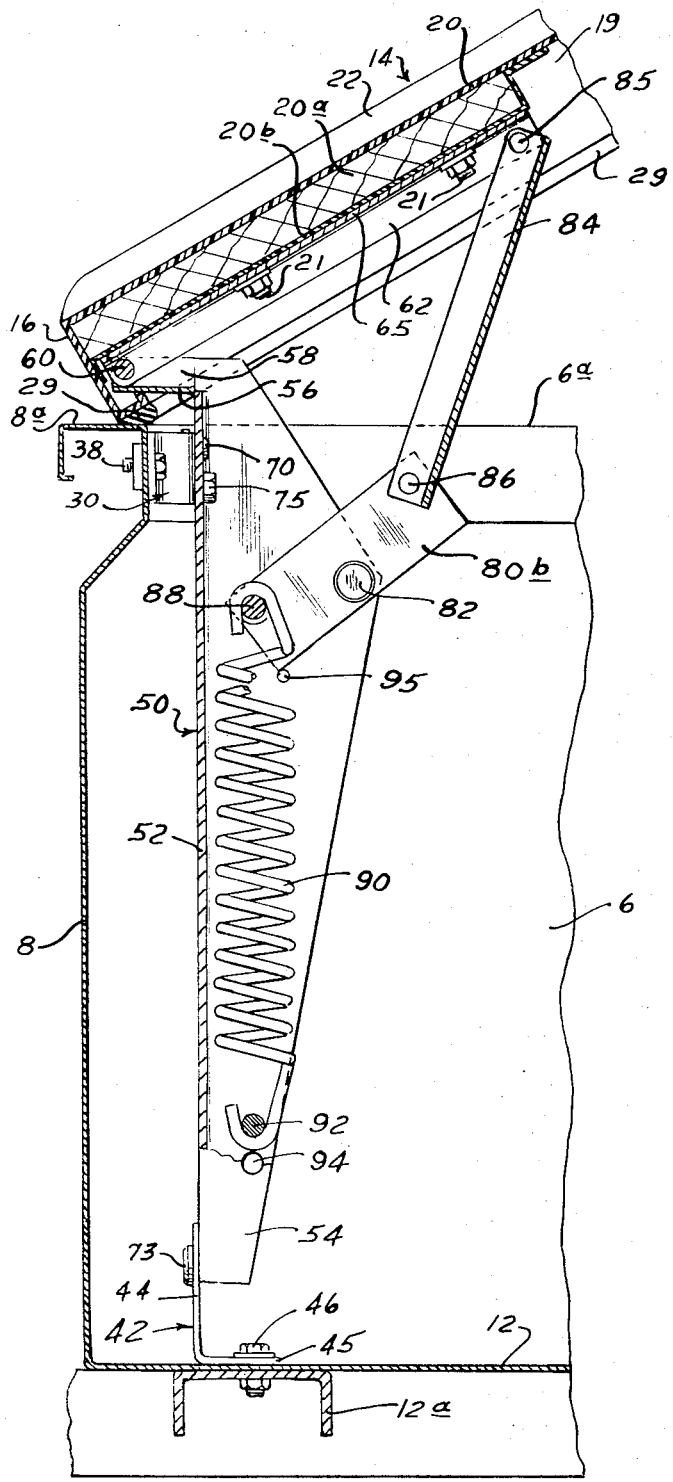
Fig. X
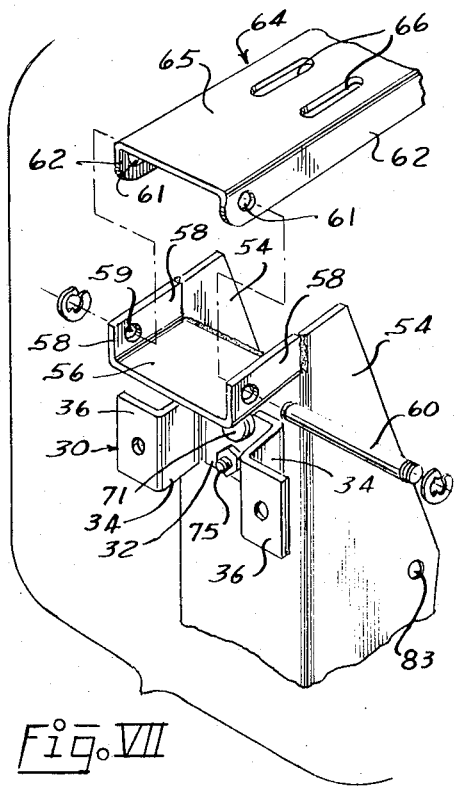
Fig. VII
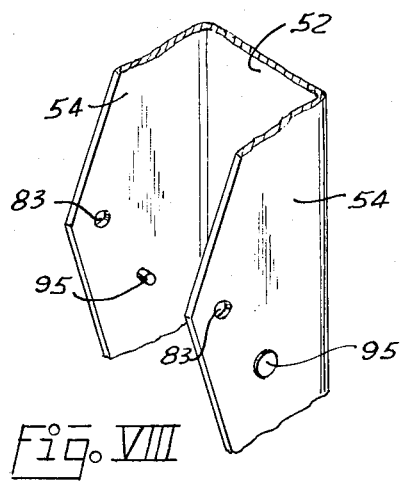
Fig. VIII
INVENTORS
Thomas E. Beveridge
Stephen G. Andrle
BY
Howard E. Moore
Gerald G. Crutsinger
ATTORNEYS

COVER AND LIFTING MECHANISM FOR PICK-UPS

BACKGROUND OF INVENTION

Lightweight vehicles having an open load bed, commonly referred to as pickup trucks, are widely used for transporting articles of various sizes and shapes.

Heretofore, primary disadvantages of using pickup trucks for hauling articles have resulted from the inability of the operator to secure small articles in the load bed of the truck while the truck was left unattended, the inability of the operator to protect articles from weather, the inability of the operator to prevent small lightweight objects from blowing out of the load bed, and the inability of the operator to haul large objects in a pickup truck to which a cover was attached.

Covers most widely used on pickup trucks have been tarpaulins tied across the load bed with ropes. Tarpaulins offer limited protection from the weather and virtually no protection against theft of articles in the load bed. Tarpaulins require substantial time for tying to the vehicle and deteriorate rapidly under continued use.

Attempts have been made to employ rigid covers on pickup trucks. However, when such covers were connected to the truck large objects could not be hauled in the truck because the covers could not be expeditiously removed. A further disadvantage of using such rigid covers has resulted from the inability of the operator to maintain the cover in a raised position without propping same up with a support pole while the pickup is being loaded or unloaded.

SUMMARY OF INVENTION

We have developed a rigid cover for pickup trucks and apparatus to detachably secure the cover over the load bed of the pickup truck wherein the cover is connected to the load bed of the truck in such a manner as to render the load bed virtually theft-proof while allowing the cover to be quickly and easily removed by authorized personnel for hauling large objects.

The apparatus for connecting the cover to the load bed of the pickup truck includes an over-center linkage having a spring connected thereto such that the spring exerts a downward force to maintain the lid in a closed position and as the cover is raised the point to which force is applied by the spring is moved to the opposite side of a pivot point to urge the cover to the open position.

A primary object of the present invention is to provide apparatus to secure a cover over the load bed of a pickup truck such that the cover may be expeditiously connected and disconnected from the truck.

A further object of the invention is to provide apparatus to secure a cover over the load bed of a pickup truck incorporating a spring and linkage to urge the cover toward an open position when the cover is displaced from the rear wall of the pickup a predetermined distance and to urge the cover toward the closed position when the cover is displaced from the rear wall of the vehicle a distance less than the predetermined distance.

A further object of the invention is to provide apparatus to secure a cover over the load bed of a pickup truck which is adapted for use on pickup trucks having load beds of different depths without modification of the apparatus.

A still further object of the invention is to provide a cover to be positioned over the load bed of a pickup truck of strong rigid construction which may be employed as a load carrying platform for hauling objects which will not fit into the load bed of the pickup truck.

A still further object of the invention is to provide a cover for the load bed of a pickup truck adapted to form a water tight seal around edges of the cover when the cover is in the closed position.

Other and further objects of the invention will become apparent upon referring to the detailed description hereinafter following and the drawings annexed hereto.

DESCRIPTION OF DRAWING

Drawings of a preferred embodiment of the invention are annexed hereto so that the invention may be better and more fully understood, in which:

FIG. 1 is a perspective view of a pickup truck illustrating the cover in the raised position;

FIG. II is a perspective view similar to FIG. 1 illustrating the cover in the closed position;

FIG. III is a cross-sectional view through the apparatus to detachably secure the cover to the pickup;

FIG. IV is a cross-sectional view taken substantially along line IV—IV of FIG. III;

FIG. V is a cross-sectional view taken substantially along line V—V of FIG. III;

FIG. VI is a cross-sectional view taken substantially along line VI—VI of FIG. III;

FIG. VII is an exploded perspective view of the upper end of a stanchion member illustrating details of construction of the hinge;

FIG. VIII is a fragmentary perspective view of the opposite side of the stanchion viewed in FIG. VII;

FIG. IX is a fragmentary cross-sectional view taken along line IX—IX of FIG. I; and FIG. X is a cross-sectional view similar to FIG. III illustrating the cover in the raised position.

Numeral references are employed to designate like parts throughout the various figures of the drawing.

DESCRIPTION OF A PREFERRED EMBODIMENT

Referring to FIG. I of the drawing, the numeral 1 generally designates a pickup truck having a load bed 2 comprising spaced side walls 4 and 6, a front wall 8, a rear wall or tailgate 10, and a floor 12.

The walls 4–10 have surfaces 4a, 6a, 8a and 10a, respectively along the upper edges thereof which generally lie in a common plane forming the upper periphery of load bed 2.

It should be appreciated that different makes and models of vehicles have different dimensions and vary slightly in configuration. The vehicle generally designated by the numeral 1 is illustrative of a typical vehicle with which our invention may be employed. However, it should be appreciated that the vehicle 1 may assume other configurations and relative dimensions.

A cover 14 is pivotally connected to support means 15 detachably secured adjacent to the front wall 8 of the load bed 2 as will be hereinafter more fully explained.

Cover 14 has ends 16 and 17 and spaced side edges 18 and 19. Cover 14 may be constructed of any suitable material. However, the cover is preferably constructed of light weight strong rigid material such as glass reinforced polyester, ABS (acrylonitrile-butadine-styrene), PVC (polyvinylchloride) or other suitable material. In the particular embodiment of the invention illustrated in the drawing, the cover 14 is constructed of sheet material 20 having longitudinally extending corrugations 22 to provide structural reinforcement thereto. It is best illustrated in FIG. III, edges of the sheet 20 are bent transversely relative to the central portion thereof forming the channel like end 16 and sides 18 and 19 of the cover 14.

As best illustrated in FIGS. I and II, the rear end 17 of cover 14 has a downwardly extending flange of a configuration similar to that of the sides of the cover. However, a downwardly extending lip 24 is secured to the lower edge thereof and is positioned to extend around the upper portion 10a of the tailgate 10 such that the tailgate is captured between lip 24 and portions of sidewalls 4 and 6 of the vehicle to prevent pivoting the tailgate 10 from the position illustrated in FIG. II to the position illustrated in FIG. I until cover 14 is raised.

The rear end 17 of the cover 14 has a key actuated lock 26 secured thereto for disengageable connection with member 28 adjacent to the upper edge of tailgate 10.

Weather stripping 29 comprising suitable waterproof resilient material is secured to the lower edge of the end 16 and sides 18 and 19 of the cover 14 to prevent entry of water between the lower edge of the cover 14 and the edges 4a, 6a and 8a of the walls of the load bed 2.

As best illustrated in FIGS. III and VII, a bracket 30, comprising a face plate 32, spacer portions 34 and outwardly extending lugs 36, is secured by suitable means, such as bolts 38, to an upper portion of the front wall 8 of the load bed 2 of the vehicle.

As best illustrated in FIG. IV, the face plate 32 of bracket 30 has a passage comprising an open ended slot 40 having one closed end to provide a stop means extending across said passage, formed therein as will be hereinafter more fully explained.

As best illustrated in FIGS. III, IV and VI, a bracket 42 is secured to a lower portion of the load bed of the vehicle 1. In the particular embodiment of the invention illustrated in the drawing bracket 42 comprises an angle member having an upwardly extending portion 44 and a horizontally disposed portion 45 secured by suitable means such as bolts 46 to a cross member 12a of the frame of the vehicle 1. The upwardly extending portion 44 of bracket 42 has a passage comprising an open ended slot 48 formed therein.

Stanchions 50 comprise channel shaped members having a web 52 extending between flanges 54. The upper portion of the web 52 of stanchions 50 is cut away, as best illustrated in FIG. VII and has a channel member comprising a web 56 and flanges 58 welded or otherwise secured thereto. Flanges 58 have apertures 59 formed therein for receiving hinge pin 60.

Hinge pin 60 extends through apertures 61 in flanges 62 of connector member 64. Connector member 64 has a web portion 65 having elongated slots 66 formed therein to which cover 14 is attached by suitable means such as bolts 21.

Bolts 21 may be secured to cover 14 by any suitable means. However, in the embodiment of the invention illustrated in the drawing, bolts 21 extend through apertures in brace members 20a which are bonded by adhesive material to sheet material 20 and covered by a layer of plastic material 20b bonded to sheet material 20.

Stanchions 50 have spaced projections, such as rivets 70 and 72, secured to the web portion 52. Rivets 70 and 72 have enlarged head portions 71 and 73, respectively, the head portions being of a diameter exceeding the width of passages 40 and 48 in brackets 30 and 42.

From the foregoing it should be readily apparent that stanchion 50 may be disconnected from brackets 30 and 42 by merely exerting an upward force to lift rivets 70 and 72 out of open ended passages 40 and 48 and installed by reverse operation.

Each stanchion 50 has suitable disengageable locking means secured thereto, such as bolt 75, which extends through apertures in the web 52 of stanchion 50 and an aperture in face plate 32 of bracket 30 to prevent longitudinal movement of rivets 70 and 72 through passages 40 and 48 until bolt 75 is removed. Bolt 75 is accessible only from the inside of load bed 2 and thus prevents unauthorized removal of cover 14 when key actuated lock 26 is closed.

As best illustrated in FIG. IV, it should be noted that the upper rivet 70 engages the bottom of passage 40 in bracket 30 while passage 48 is of sufficient length to allow installation of stanchions 50 in vehicles having load beds of different depths since rivet 72 moves through passage 48 a distance sufficient to allow rivet 70 to become seated in the bottom of passage 40 in bracket 30.

Toggle links 80a and 80b have apertures formed in central portions thereof and are pivotally connected to flanges 54 of stanchions 50 by rivets 82. It should be noted that rivets 82 do not extend across the space between flanges 54 of stanchions 50.

Connector links 84 have ends connected by pivot pins 85 to flanges 62 of mounting plates 64 and have other ends pivotally connected by suitable means such as rivets 86 to ends of toggle links 80a and 80b. A pin 88 extends between ends of toggle links 80a and 80b in spaced apart relation from rivets 86 and has a spring 90 secured thereto. The opposite end of spring 90 is connected to an anchor pin 92, which is selectively positionable in spaced apertures 94 in flanges 54 of stanchion 50 for adjusting tension in spring 90.

As best illustrated in FIG. III of the drawing, when the cover 14 is in the closed position, wherein the rear end 17 of the cover is in engagement with the upper edge 10a of rear wall 10 of the load bed 2, the line of action of spring 90 is to the right of the axis of rivets 82 about which toggle links 80a and 80b pivot. Thus links 80a and 80b are urged in a clockwise direction, as viewed in FIG. III, by force applied thereto by spring 90. Force is applied through connector 84 urging cover 14 toward a closed position.

As best illustrated in FIG. X, movement of cover 14 toward the open position causes the line of action on spring 90 to move to the left of the center of rivet 82 thus causing spring 90 to apply a force tending to rotate links 80a and 80b in a counterclockwise direction, as viewed in FIGS. III and X, thereby applying a force through connector 84 urging cover 14 toward a raised position.

As best illustrated in FIGS. III and VIII, stop members 95 are secured to flanges 54 of stanchions 50 in spaced apart relation from apertures 83 through which rivets 82 extend. Stops 95 are positioned such that links 80a and 80b move into engagement therewith to prevent rotation of links 80a and 80b to a position which would carry the center of pin 86 across a line connecting rivets 82 and pin 85. Thus, when an external force is applied to the end 17 of cover 14 links 80a and 80b will be rotated back to the position illustrated in FIG. III urging the cover toward the closed position.

From the foregoing it should be readily apparent that we have developed improved apparatus to connect a rigid cover over the load bed of a vehicle. The cover 14 may be removed by merely disconnecting bolt 75 and lifting rivets 70 and 72 on stanchions 50 upwardly to disengage passages 40 and 48 in brackets 30 and 42 respectively. Thus cover 14 may be expeditiously attached to or disconnected from the vehicle 1. The overcenter linkage arrangement results in a shifting of the line of action of spring 90 for urging the cover 14 toward a closed position until the cover 14 is raised a predetermined distance. As cover 14 is raised the center of pin 88 having one end of spring 90 connected thereto moves relative to the center of rivets 82. A downward force is exerted on cover 14 until the center of pin 88 moves to a position wherein the centers of pin 88, rivet 82 and pin 92 become aligned. Further movement of cover 14 causes spring 90 urge cover 14 toward a raised position.

It should be appreciated that the apparatus hereinfore described is a preferred embodiment of our invention. However, minor modifications may be made to the structure without departing from the basic concept of our invention. For example, if it is deemed expedient to do so the lower bracket 52, which is illustrated as connected to the floor 12 of the load bed 2 of the vehicle, may assume the general configuration of bracket 30 allowing connection thereof to the front wall 8 of the vehicle.

Having described our invention we claim:

1. Apparatus to connect a cover to the load bed of a vehicle comprising, a first bracket; means to secure the first bracket to a lower portion of the load bed; a second bracket; means to secure the second bracket to an upper portion of the load bed, each of said brackets having passages formed therein; a stanchion; spaced projections on said stanchion, said projections being adapted for sliding engagement along the passages in the brackets; means to pivotally connect a cover to the stanchion; and disengageable locking means secured between said stanchion and at least one of said brackets to limit longitudinal movement of said projections in said passages.

2. Apparatus to connect a cover to a load bed of a vehicle comprising, a stanchion; means to secure said stanchion adjacent a front wall of the load bed of the vehicle; means to pivotally connect a cover to the stanchion; a link; means to pivotally connect a central portion of the link to the stanchion; a connector member; means to connect one end of the connector member to a cover; means to pivotally connect another end of the connector member to a first end of the link; and resilient means connected to a second end of the link, said resilient means being positioned to exert a moment in one direction when the cover is raised and in an opposite direction when the cover is closed.

3. The combination called for in claim 2 wherein the means to secure the stanchion adjacent the front wall of the load bed of a vehicle comprises, a first bracket; means to secure the first bracket to a lower portion of the load bed; a second bracket; means to secure the second bracket to an upper portion of the load bed, each of said brackets having passages formed therein; and spaced projections on said stanchion, said projections being adapted for sliding engagement with the passages in the brackets.

4. The combination called for in claim 3 with the addition of stop means extending transversely across the passage in the second bracket such that one of the projections on the stanchion engages the stop means before the other projection on the stanchion engages an end of the passage in the first bracket.

5. The combination called for in claim 4 with the addition of disconnectable means for securing the stanchion to at least one of the brackets to limit movement of the projections on the stanchions relative to the brackets.

6. The combination called for in claim 3 wherein the first bracket comprises a substantially vertically disposed member, the passage in the first bracket having a length greater than the length of the passage in the second bracket such that the projection on the stanchion in sliding engagement with the passage in the first bracket does not limit vertical motion of the stanchion.

7. The combination called for in claim 2 with the addition of disengageable means connectable to the cover to lock the cover in a closed position.

8. The combination called for in claim 2 wherein the means to pivotally connect a cover to the stanchion comprises, a mounting member having elongated passages formed therein; means connectable between a cover and the passages in the mounting member; and means to pivotally connect the mounting member to the stanchion.

9. In combination with a vehicle having an open load bed defined by a front wall, spaced side walls, and rear wall, a rigid cover; support means; means to secure the support means adjacent the front wall of the load bed of the vehicle; means to pivotally connect a first end of the cover to the support means, such that a second end of the cover is movable between an open position spaced away from the rear wall of the vehicle and a closed position engaging the rear wall of the vehicle; a link; pivot means to connect the link to the support means; a spring; first connecting means to connect one end of the spring to the support means; anchor means to secure the other end of the spring to an end of the link; and second connecting means to connect the other end of the link to the cover, said first and second connecting means being positioned on the same side of the pivot means when the cover is in the closed position and on opposite sides of the pivot means when the cover is in the open position, such that the cover is urged toward the open position when the second end of the cover is displaced from the rear wall a predetermined distance and is urged toward the closed position when the second end of the cover is displaced from the rear wall a distance less than said predetermined distance.

10. The combination called for in claim 9 with the addition of means to detachably secure the support means adjacent the front wall of the load bed of the vehicle.

11. The combination called for in claim 10 wherein the means to detachably secure the support means to the vehicle comprises spaced brackets; interengaging surfaces on the brackets and the support means; and locking means to detachably secure the interengaging surfaces together.

12. The combination called for in claim 9 wherein the support means comprises spaced stanchion members secured to the vehicle; and the means to pivotally connect the cover to the support means comprises hinge means operably connected between the stanchions and the cover.

13. The combination called for in claim 12 wherein the hinge means in positioned to be accessible only from the inside of the vehicle to which the cover is attached.

* * * * *